Dec. 7, 1954  L. E. FOUST  2,696,287
MOBILE LOADER
Filed May 11, 1950  3 Sheets-Sheet 1
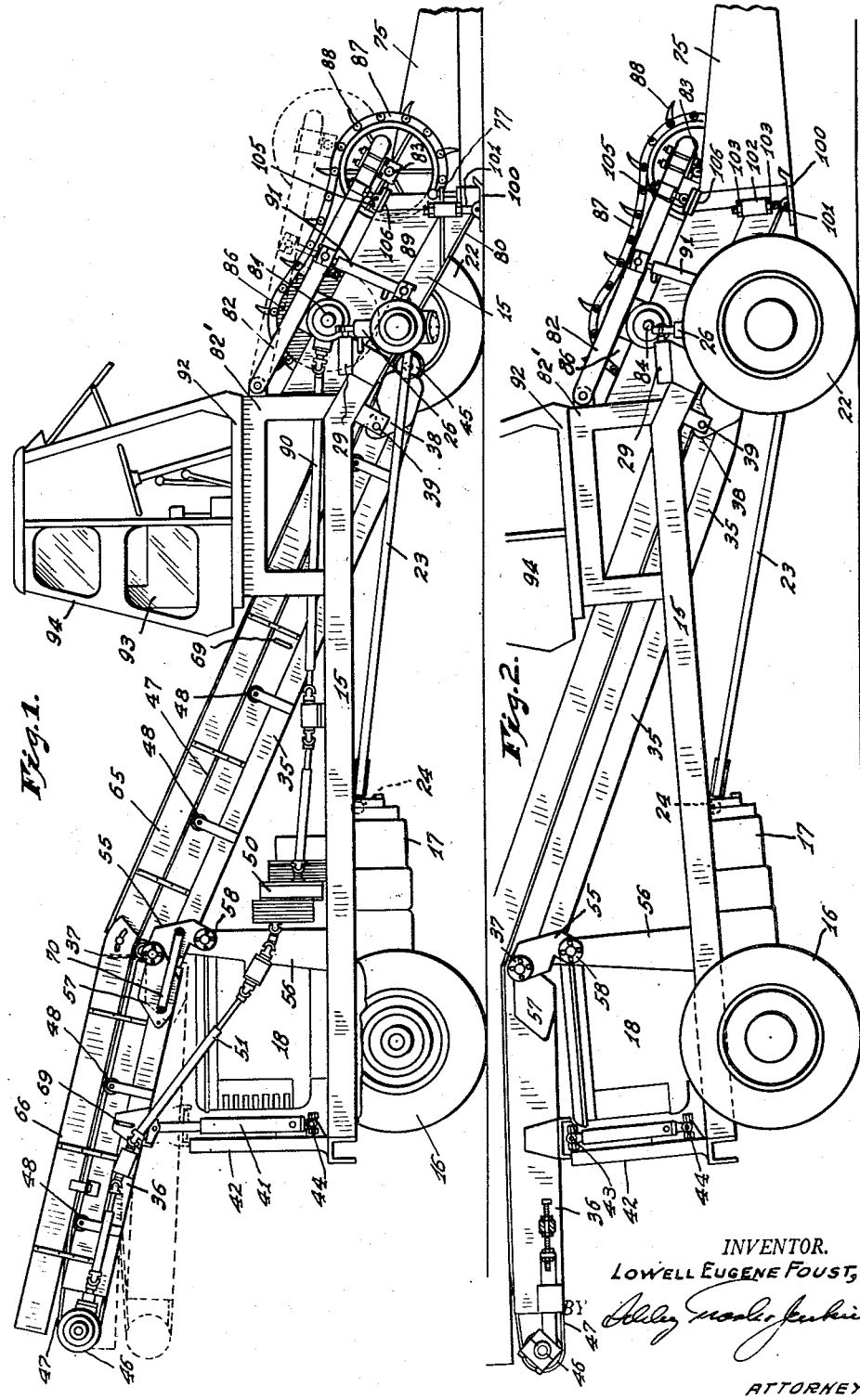
INVENTOR.
LOWELL EUGENE FOUST,
BY
ATTORNEYS.

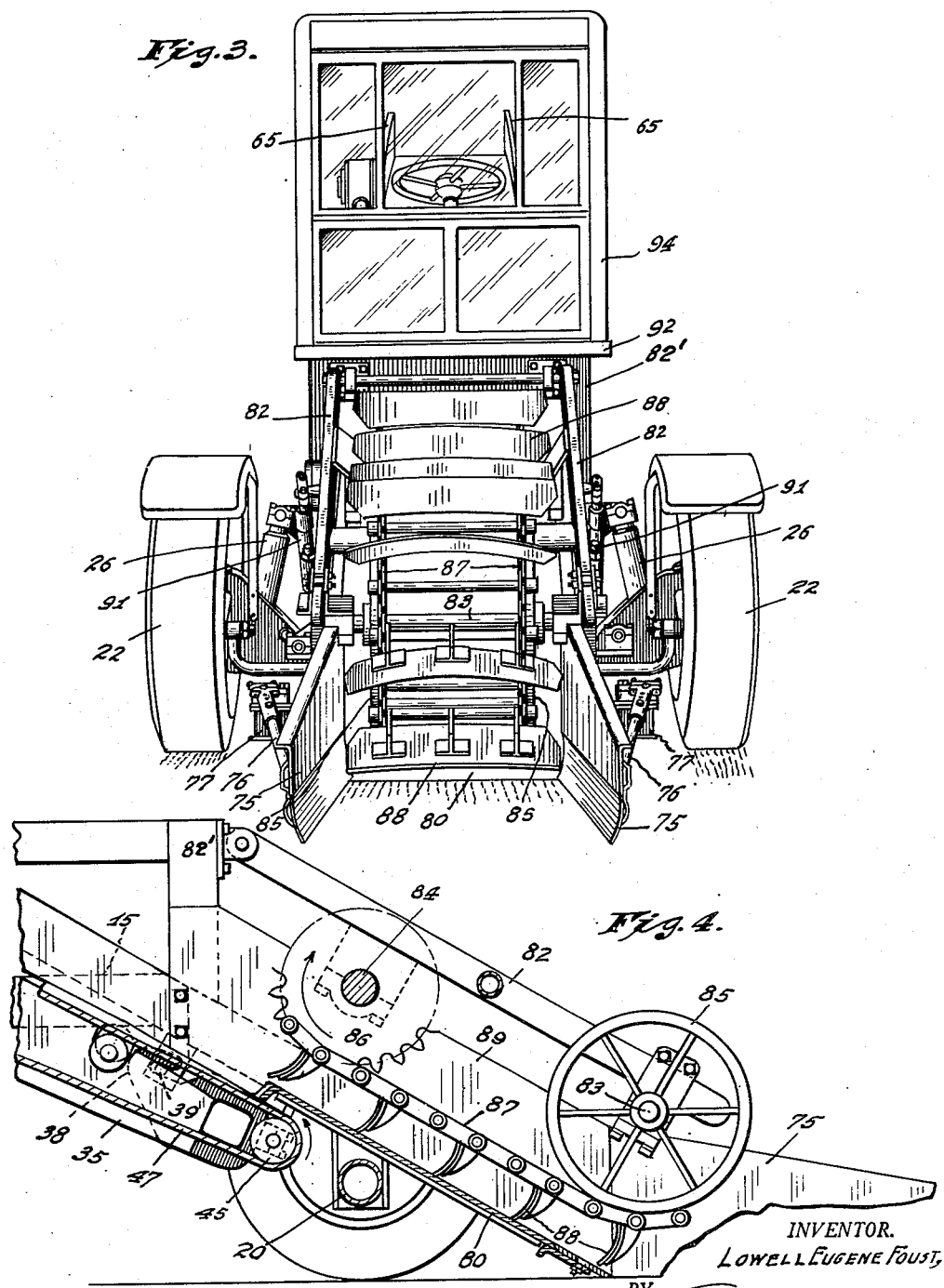

Dec. 7, 1954     L. E. FOUST     2,696,287
MOBILE LOADER
Filed May 11, 1950     3 Sheets-Sheet 3
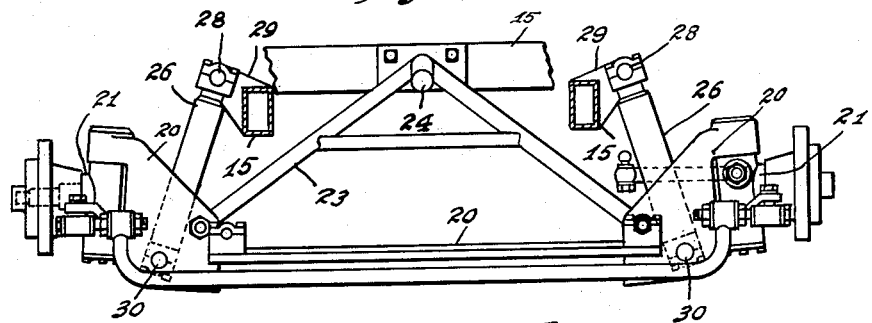
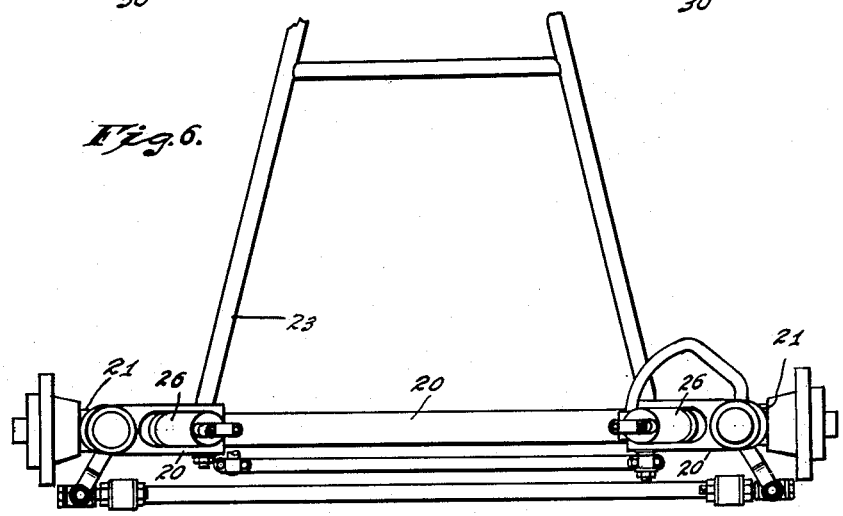
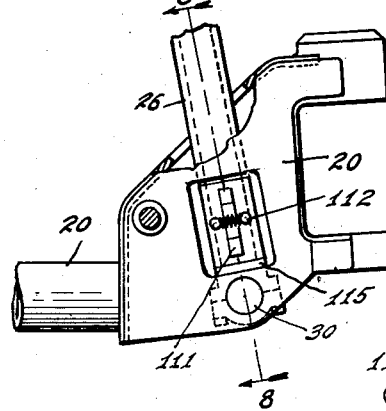
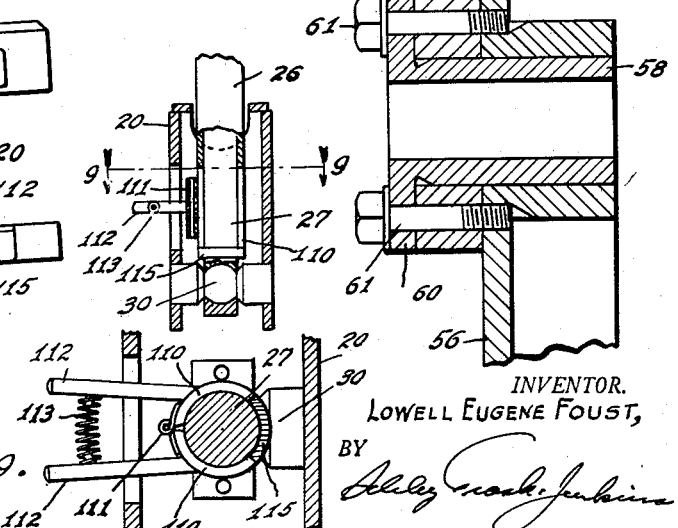
INVENTOR.
LOWELL EUGENE FOUST,
BY
ATTORNEYS.

United States Patent Office 2,696,287
Patented Dec. 7, 1954

2,696,287

MOBILE LOADER

Lowell Eugene Foust, Indianapolis, Ind., assignor to J. D. Adams Manufacturing Company, Indianapolis, Ind., a corporation of Indiana Application May 11, 1950, Serial No. 161,432

2 Claims. (Cl. 198—8)

This invention relates to loaders and, more particularly to mobile loaders, adapted to elevate ground-supported material and discharge it at an elevated point, as into a truck. It has heretofore been proposed to produce a mobile loader comprising a wheel-supported main frame adapted to be propelled over the ground and provided with a belt conveyor extending upwardly and rearwardly from a point near the front end of the machine to an elevated point of discharge near the rear end of the machine. To aid in feeding windrowed material to the conveyor as the machine runs along a windrow and astride it, the front end of the machine is provided with forwardly diverging gathering blades and with a feeder by which the material gathered by such blades is elevated onto the forward end of the conveyor.

It is an object of the present invention to produce a loader, and particularly a mobile loader, of the type described which will possess advantages over prior loaders in respect to simplicity and flexibility of design and to ease of operation and control. Another object of the invention is to produce a machine of the type indicated which will embody a belt conveyor and a conveyor frame so constructed and associated with the main frame that the entire conveyor can be readily removed as a unit from association with the remainder of the machine to facilitate replacement of a belt of the endless type. Still another object of the invention is to produce a mobile loader in which the weight of the front end of the main frame can be applied to the gathering blades, and preferably also to the feeder, so as to facilitate the gathering and elevation of hard-surfaced material.

In carrying out the invention in its complete form, I employ a main frame supported at its rear end on driving wheels and at its front end from a front axle supported on dirigible wheels. The front end of the main frame is supported from the front axle by adjustable means controlling its elevation. A belt conveyor carried by the main frame extends from a point in rear of the front axle upwardly and rearwardly to an elevated point of discharge near the rear end of the machine. The feeder mechanism includes an apron which extends from a point above the conveyor near the front end thereof forwardly and downwardly over the front axle, and a vertically adjustable feeder frame carrying an endless series of feeder blades adapted to be moved over a closed path to move material upwardly and rearwardly along the apron and discharge it onto the conveyor for elevation thereby. Also mounted at the front end of the main frame are a pair of forwardly diverging gathering blades adapted to gather windrowed material as the machine moves forwardly astride a windrow, whereby such material will be positioned to be engaged by the feeder blades. Where the mechanism which controls the elevation of the front end of the frame is hydraulic in character, I may employ removable safety means adapted to prevent lowering of the main frame should the hydraulic pressure fail, thus insuring against accidental lowering of the main frame to bring the gathering blades into contact with the ground when the machine is being transported under its own power. Controls for the feeder, conveyor, driving means, and steering means are located at an operator's position above the conveyor and in rear of the feeder, so that the operator can readily observe the operation of the feeder and the discharge of material from the conveyor while in position to steer and control the forward speed of the machine.

The accompanying drawings illustrate the invention: Fig. 1 is a side elevation of the machine in operating position; Fig. 2 is a view similar to Fig. 1, but showing the machine adjusted for transport; Fig. 3 is a perspective view of the front end of the machine; Fig. 4 is a fragmental view, similar to Fig. 1 but on an enlarged scale and in partial section, illustrating details of the feeder and its association with the conveyor; Fig. 5 is a front elevation of the front axle and associated parts, showing the main frame in section; Fig. 6 is a plan view of the front axle and associated parts; Fig. 7 is a fragmental front elevation of the front axle on an enlarged scale; Fig. 8 is a section on the line 8—8 of Fig. 7; Fig. 9 is a section on the line 9—9 of Fig. 8; and Fig. 10 is a sectional view illustrating a detail of the conveyor mounting.

The machine shown in the drawings comprises a main frame 15 supported at its read end on drive wheels 16 connected through appropriate speed-changing and clutch mechanism 17 to an internal combustion engine 18 mounted on the frame at its rear. The front end of the frame 15 is supported for vertical adjustment from a front axle 20 provided at its ends with steering knuckles 21 supporting steerable wheels 22. Rigid with the front axle is a brace-frame 23 having a general A-shape and extending upwardly and rearwardly from the front axle to a ball-and-socket joint 24 through which it is connected to the main frame 15.

To control the elevation of the front end of the main frame, I employ a pair of hydraulic jacks each including a cylinder 26 and a piston 27 (see Figs. 5 and 8). The upper ends of the cylinders 26 are connected through ball-and-socket joints 28 with brackets 29 secured to opposite sides of the main frame 15, while the lower ends of the pistons 27 are secured through ball-and-socket joints 30 with the front axle at points near the ends thereof. The cylinders 26 are provided near their upper ends with fittings through which fluid under pressure can be admitted to the cylinders to raise the front end of the main frame or withdrawn from the cylinder to lower the front end of the main frame.

The conveyor includes a front frame 35 and a rear frame 36 pivotally connected as at 37 on a horizontal transverse axis located above the frame 15 and toward the rear thereof. The front frame-section 35 of the conveyor extends downwardly and forwardly from the point 37 between the side members of the main frame 15 to a point in rear of the front axle, where forwardly opening hooks 38 are secured to it for supporting engagement with pins 39 carried by the main frame 15. The rear frame-section 36 of the conveyor is adjustably supported from the main frame 15 by means of a hydraulic jack 41 which can be extended to swing the rear conveyor framesection 36 upwardly about the axis 37 or retracted to lower such frame section into the dotted-line position shown in Fig. 1, where it rests on a guard or bumper 42 projecting upwardly from the main frame 15 at the rear of the engine 18. Conveniently, the piston and cylinder of the jack 41 are connected respectively to the conveyor frame 36 and the guard 42 through ball-and-socket joints 43 and 44.

Mounted at the lower forward end of the front framesection 35 is an idler roller 45, and mounted in the rear end of the rear-section 36 is a drive roller 46; and over such two rollers a conveyor belt 47 is trained. The upper stretch of the conveyor belt 47 is supported on intermediate rollers 48 mounted on the front and rear frame-sections 35 and 36. The drive roller 46 is operatively connected to a power take-off 50 through appropriate mechanism including universal joints and a telescopic shaft 51 which permit the above mentioned adjustment of the rear conveyor-frame 36.

For the purpose of supporting the rear end of the front conveyor-frame 35, it may have secured to it a pair of brackets 55 connected to a standard 56 which extends upwardly from the main frame 15 near the front end of the engine 18, the brackets 55 being also pivotally connected to brackets 57 attached to the front end of the rear conveyor-frame 36.

In Fig. 10, I have illustrated a preferred means for connecting each bracket 55 to the standard 56. As there shown, the bracket 55 overlaps exteriorly the upper end of the standard 56; and the standard and bracket are provided with openings for the reception of a bushing 58 having a flange 60 at its outer end. Screws 61 extending through holes in the bushing flange 60 and into threaded holes in the standard 56 serve to hold the bushing 58 in place. If desired the same type of connection as is illustrated in Fig. 10 may be employed at 37 to provide the pivotal interconnection between the brackets 55 and 57.

Flare-boards 65 and 66 secured respectively to the front and rear conveyor frames serve the confine laterally material being elevated on the upper stretch of the conveyor belt 47.

The entire conveyor, as above described is readily removable from association with the balance of the machine, it being necessary only to remove the two bushings 58 on opposite sides of the machine, disconnect the ball-and-socket joint 43 between the jack 41 and the rear conveyor frame 36, and then move the entire conveyor upwardly and rearwardly to disengage the hooks 38 from the pins 39. Hooks or eyes 69 provided on the side of the conveyor frame-sections 35 and 36 may be employed to facilitate the attachment of hoisting chains or cables by which the conveyor may be supported during its removal. In the removal of the conveyor, the two parts of the telescoping shaft 51 separate. With the conveyor out of the machine, the flare-boards 65 and 66 on one side may be removed to permit the conveyor belt 47 to be moved axially off the rollers 45 and 46. Thus, it is possible and practicable to employ a conveyor belt 47 of the endless type. To facilitate handling of the conveyor during and after its removal from the machine, a rigid strut 70 may be bolted to the brackets 55 and 57 at either or both sides of the conveyor, thus preventing relative swinging of the two conveyor sections about the axis 37. Such strut will of course be removed when the machine is in use.

On each side of the main frame near the front end thereof there is provided a gathering blade 75 desirably attached to the main frame for swinging movement about a vertical axis. Telescopically adjustable struts 76 extending between the gathering blade 75 and brackets 77 projecting radially from the main frame permit the gathering blades to be adjusted to increase or diminish the distance between their front ends.

Between the rear ends of the gathering blades 75 there is supported from the main frame 15 in any convenient manner an apron 80 which extends upwardly and rearwardly from a point at ground level, passing above the front axle 20 and terminating at a point above the upper stretch of the belt conveyor 47. To facilitate transfer of the material gathered by the blades 75 upwardly over the apron 80 to the conveyor, I may employ the feeder illustrated in Figs. 1 through 4. Such feeder comprises a frame 82 pivotally connected at its rear end on a horizontal transverse axis to an elevated portion 82' of the main frame 15. The frame 82 supports front and rear shafts 83 and 84, the former shaft carrying idlers and the latter sprockets 86 over which a chain 87 is trained. The chain 87 carries a continuous series of feeder blades 88 which, as the chain operates in a clockwise direction (Fig. 4), pass upwardly and rearwardly above the apron 80 to move material therealong and discharge it onto the upper stretch of the belt 47. Plates 89 arranged at opposite sides of the apron 80 and extending upwardly from the rear ends of the gathering blades 75 confine laterally the material which is moved upwardly along the apron by the blades 88. Preferably, the blades 88 are curved transversely of the machine and moved with their concave sides presented forwardly with respect to their direction of movement, as will be clear from Fig. 3. The upper shaft 84 of the feeder is operatively connected with the engine through appropriate power-transmitting mechanism shown as including universal joints and a telescoping shaft 90 which permit the vertical movement of the feeder.

For the purpose of vertically adjusting the feeder about the axis of pivotal connection between its frame 82 and the main frame of the machine, hydraulic jacks 91 act between the front end of the main frame and the feeder frame 82 at each side of the machine. Preferably, these jacks are double-acting so that they may be employed to exert either upward or downward pressure on the feeder. The application of downward pressure to the feeder is of advantage in enabling the feeder to move material which is frozen or otherwise so hard that the weight of the feeder alone will be insufficient to cause the blades 88 to penetrate it.

The elevated frame-portion 83 supports an operator's platform 92, a seat 93, and desirably a cab 94 within which are located the controls for operating and steering the vehicle, for operating the conveyor and feeder, and for adjusting the hydraulic jacks 41, 26—27, and 91. The precise form of the control means forms no part of the present invention and hence is not fully illustrated in the drawings. Also not illustrated in detail is the hydraulic system which, as will be understood, embodies a pump appropriately driven from the engine 18.

Transversely of the machine, the operator's cab 94 is located directly above the conveyor. From this position, the operator can, while steering the machine, observe the operation of the feeder and appropriately control its elevation; and by looking rearwardly through rear windows in the cab, he can observe the discharge of material from the conveyor at its rear end and can control the elevation of the rear end of the conveyor as desired.

Ground-engaging shoes 100 (see Figs. 1 and 2) are mounted on opposite sides of the main frame 15 at its forward end to prevent the gathering blades 75 from digging into the ground when the machine is moving forwardly in its normal operation. Desirably such shoes are adjustable, as by being mounted on the lower ends of screw-threaded shanks 101 which extend upwardly through ears 102 secured to the main frame and which are provided above and below such ears with adjusting nuts 103.

While, as above noted, the feeder can be positively positioned by operation of the jacks 91, it will usually be desirable during operation to let the feeder position itself vertically in response to the reaction on the blades of the material upon which they act. To prevent the feeder blades 88 from bearing too heavily on the apron 80, when the material being fed is insufficient to keep the feeder elevated, the feeder frame 82 may be provided at its front end with adjustable shoes 105 adapted to engage abutments 106 on the main frame and limit downwardly movement of the feeder frame 82.

In the operation of the machine described, the jacks 26—27 are operated to lower the front end of the main frame until the shoes 100 engage the ground. With the gathering blades 75 adjusted as desired to gather wind-rowed material, the machine is driven along the windrow. The material in the windrow is engaged by the downwardly and rearwardly moving feeding blades 88 and elevated by them upwardly along the apron 80 to be discharged onto the upwardly moving upper stretch of the conveyor belt 47 at the rear edge of the apron. At the rear end of the conveyor, the material is discharged, conveniently into a truck which runs rearwardly in rear of the machine. As pointed out above, all operations performed by the machine are within sight of the operator in the cab 94, and the operation of the machine is therefor readily controlled.

When the machine is to be transported, the jacks 26—27 are operated to raise the front end of the main frame as illustrated in Fig. 2, thus supporting the gathering blades 75 and the shoes 100 above the surface upon which the machine is to operate. To guard against lowering of the main frame which might follow the accidental lowering of hydraulic pressure in the jack-cylinders 26, the safety device illustrated in Figs. 7, 8, and 9 may be employed. Such a device comprises a pair of arcuate shoes 110 pivotally connected at 111 and adapted to receive the piston 27 between them. Each shoe has rigid with it an operating arm 112, and between such arms there acts a spring 113 resiliently forcing the shoes 110 toward each other. When the front end of the main frame is elevated, upward movement of each jack cylinder 26 exposes the lower end of the piston 27, as will be clear from Fig. 8. The safety device is then applied to the exposed lower end of each piston 27, by forcing the arms 112 toward each other until the shoes are far enough apart to be applied to the piston. Upon release of pressure upon the arms 112, the spring 113 acts to hold the shoes in contact with the piston between the lower end of the cylinder 26 and a flange 115 on the lower end of the piston. Should hydraulic pressure in the cylinders 26 fail, the front end of the main frame 15 cannot descend beyond the point at which the lower ends of the cylinders 26 engage the shoes 110. When it is desired to operate the machine, fluid under pressure is supplied to the cylinders 26 to relieve any clamping action that may have been exerting on the shoes 110, the arms 112 are forced together to the extent necessary to permit the shoes to clear the piston, and the safety devices are removed. Elevation of the front end of the main frame will thereafter be under control of the jacks 26—27, which are desirably interconnected so that the hydraulic fluid can pass from one to the other to permit the front axle to rock in passing over uneven ground.

I claim as my invention:

1. In a mobile loader, a main frame comprising laterally spaced, longitudinally extending side members; wheels supporting said main frame at its front and rear ends; a frame-extension rigid with the main frame and projecting upwardly therefrom near the rear end thereof; a belt conveyor comprising a conveyor frame having front and rear sections pivotally interconnected on a horizontal axis transverse to the main frame, means for adjusting the rear conveyor-frame section about such axis, a conveyor belt, and rollers carried by said conveyor frame for supporting said belt, one of said rollers being a belt-driving roller located near the outer end of the rear conveyor-frame section; releasable means located near the top of said extension and near the front of the main frame for supporting the conveyor frame entirely from the main frame with its front section in a fixed, forwardly and downwardly extending position; an engine on the main frame; and a separable driving connection between said engine and belt-driving roller; said driving connection including a telescoping shaft the two parts of which are respectively supported from the main frame and rear conveyor-frame section; said conveyor being removable as a unit from said main frame upon release of said supporting means.

2. In a mobile loader, a main frame comprising laterally spaced, longitudinally extending side members; wheels supporting said main frame at its front and rear ends; a frame-extension rigid with the main frame and projecting upwardly therefrom near the rear end thereof; a belt conveyor comprising a conveyor frame having front and rear sections pivotally interconnected on a horizontal axis transverse to the main frame, a conveyor belt, and rollers carried by said conveyor frame for supporting said belt, one of said rollers being a belt-driving roller; releasable means located near the top of said extension and near the front of the main frame for supporting the front conveyor-frame section entirely from the main frame in a fixed, forwardly and downwardly extending position; an additional releasable and adjustable supporting means acting between said main frame and the rear conveyor-frame section for adjusting the latter about said axis; an engine on the main frame; a separable driving connection between said engine and belt-driving roller; said conveyor being removable as a unit from said main frame upon release of said supporting means; and means acting between the two conveyor-frame sections for limiting their relative swinging movement about their axis of interconnection when the conveyor is removed from the main frame.

References Cited in the file of this patent

UNITED STATES PATENTS

| Number | Name | Date |
|---|---|---|
| 1,078,132 | Davison | Nov. 11, 1913 |
| 1,144,460 | Byrne | June 29, 1915 |
| 2,208,128 | Holbrook | July 16, 1940 |
| 2,267,419 | Oster | Dec. 23, 1941 |
| 2,334,304 | Arnett | Nov. 16, 1943 |
| 2,400,086 | Hansen | May 14, 1946 |
| 2,425,681 | Lewis | Aug. 12, 1947 |
| 2,427,324 | Farr | Sept. 9, 1947 |
| 2,454,860 | Clark | Nov. 30, 1948 |
| 2,501,448 | Lockwood | Mar. 21, 1950 |